April 6, 1948. R. J. GREENE 2,438,996
RADIANT OVEN AND BROILER BURNER
Filed Dec. 4, 1943 2 Sheets-Sheet 1

Inventor
Raymond J. Greene

By Frease and Bishop
Attorneys

Inventor
Raymond J. Greene
By Frease and Bishop
Attorneys

Patented Apr. 6, 1948

2,438,996

UNITED STATES PATENT OFFICE 2,438,996

RADIANT OVEN AND BROILER BURNER

Raymond J. Greene, Sebring, Ohio

Application December 4, 1943, Serial No. 512,902

2 Claims. (Cl. 158—99)

The invention relates to a combination oven and broiler burner for cooking stoves in which gas is used for fuel, and more particularly to a burner of this type having radiants adjustably mounted thereon for selectively radiating the heat downward into the broiler or permitting the heat to circulate upward into the oven.

Under present practice, gas cooking stoves of the character referred to are commonly provided with a single burner for heating both the oven and the broiler, but since such burners are designed primarily to heat the oven by circulation of heat upward from the burner the maximum heat of the burner is not obtained in the broiler.

While efforts have been made to produce a burner which will heat the broiler more efficiently, by fixing a substantially U-shape ceramic radiant over the top and sides of the burner pipe so as to radiate the heat downward into the broiler such devices decrease the efficiency of the burner for heating the oven.

It is therefore an object of the present invention to provide a burner for heating the oven by circulating heat or for heating the broiler by radiated heat, as desired.

Another object is to provide a burner including a burner pipe and an adjustable radiant arranged to be moved to a position just above the flame jets of the pipe to radiate the heat downward into the broiler or to a position away from the flame jets to permit the heat to circulate upward into the oven.

A further object is to provide a burner of this type in which the radiant is vertically movable to positions above and below the flame jets of the burner pipe.

A still further object is the provision of such a burner in which a plurality of radiants are simultaneously moved relative to the burner pipes so as to change from downwardly radiated heat to upwardly circulating heat or vice versa.

Another object is to provide a burner of the character referred to in which when the radiants are raised the flame impinges upon the radiants so as to radiate all of the heat downward into the broiler and when the radiants are lowered cuts off all radiant heat downward and conducts all circulating heat from the burner pipes upward into the oven.

Figure 1:
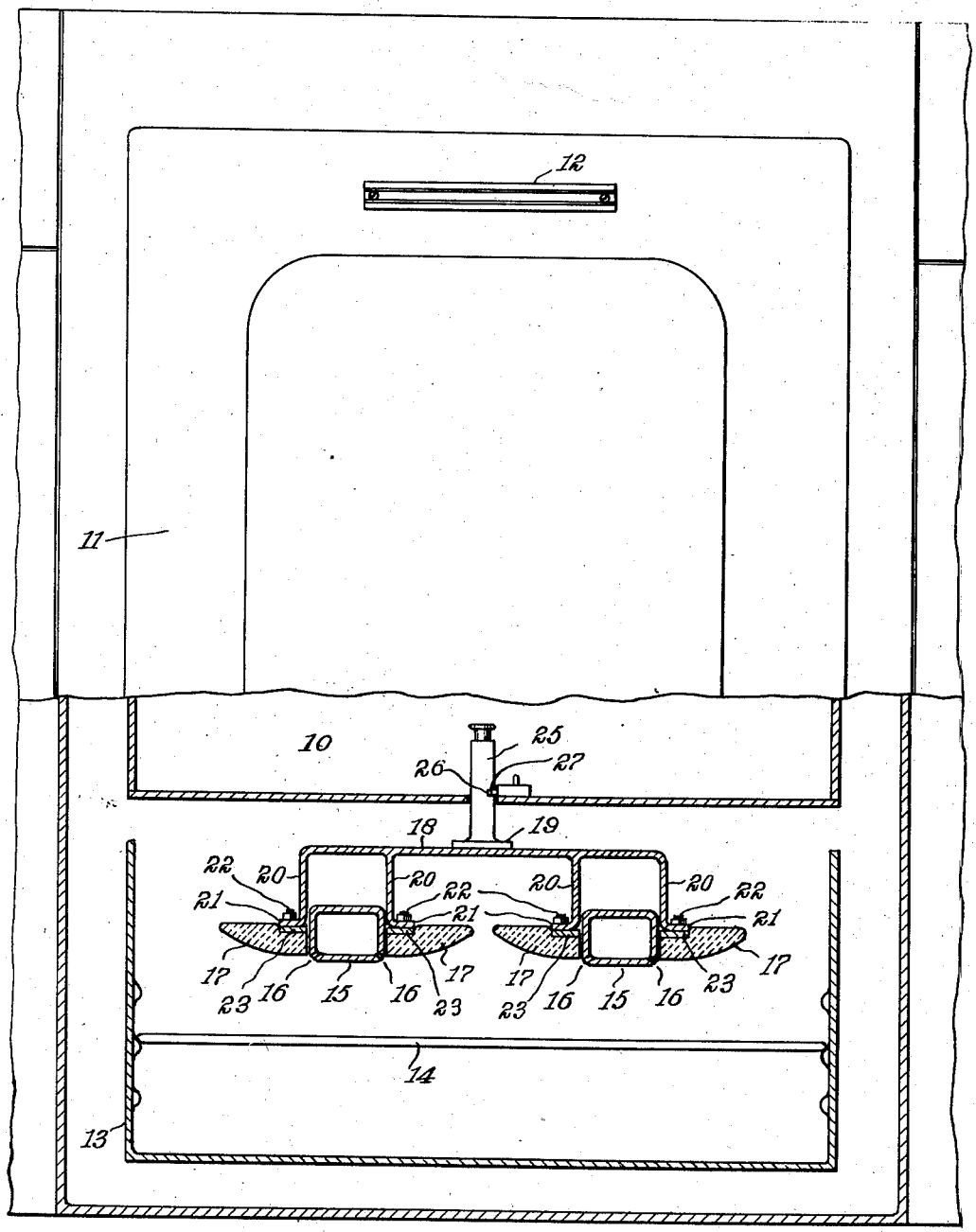
Figure 2:
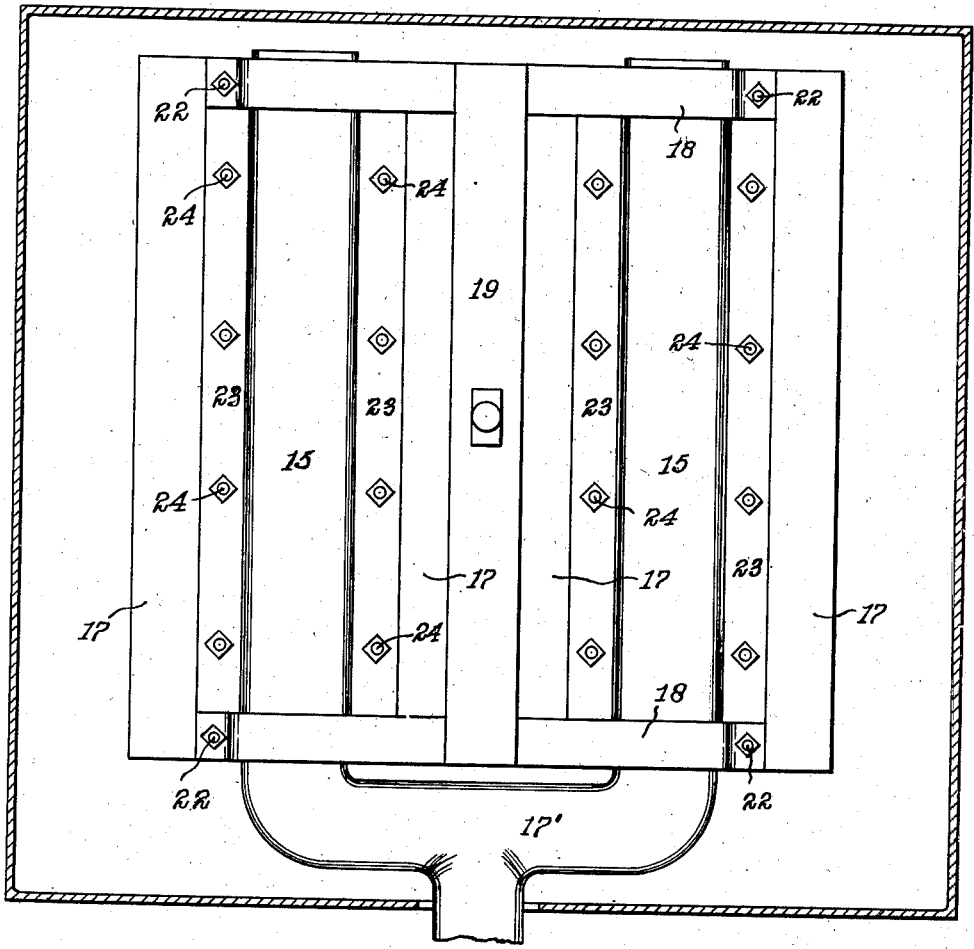

The above objects together with others that will be apparent from the drawings and following description, or that may be later referred to, may be attained by constructing the improved burner in the manner illustrated in the accompanying drawings, in which:

Figure 1 is a front elevation, partly in section, of the oven and broiler of a gas range, showing the usual burner pipes located between the oven and broiler, vertically adjustable radiants being shown associated with the burner in raised position for heating the broiler;

Fig. 2, a top plan view of the burner shown in Fig. 1; and

Figure 3:
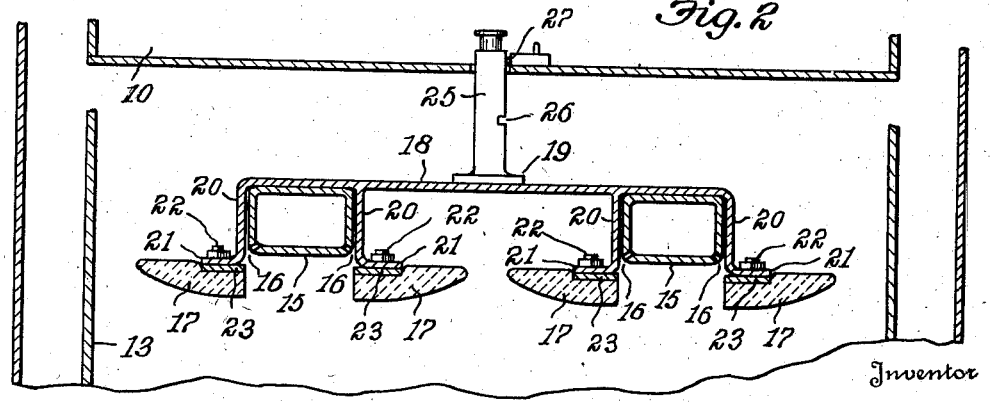

Fig. 3, a vertical, transverse section through the burner showing the radiants in lowered position for heating the oven.

Similar numerals refer to similar parts throughout the drawings.

The invention resides broadly in the association of radiants, of ceramic or other suitable material, with the conventional burner pipes, with means for moving the radiants to horizontal position just above the flame in order to heat the radiants and radiate all of the heat downward into the broiler, or to position below the flame so as to shut off all radiant heat to the broiler and permit circulation of the heat upward into the oven.

As illustrated, the invention is applicable to any usual form of gas burner such as now commonly used in ovens and broilers, in which one or more substantially horizontal fuel pipes are provided having openings or flame jets along opposite sides.

In the form of the invention illustrated and described herein a portion of a conventional gas range is shown in Figure 1 in which the oven is indicated generally at 10, arranged to be normally closed by the usual door 11 provided with the handle 12 for operating the same.

The broiler is indicated generally at 13, and may be provided with the usual shelf or broiler tray 14 arranged to be adjustably mounted relative to the burner as in usual practice.

All of these parts may be of any usual and well known construction and arrangement, and in themselves form no part of the present invention which is concerned with the construction and arrangement of the burner as will be later described.

The burner may be of the horseshoe or U-shape type in which two spaced, horizontal, parallel fuel pipes 15, each having the flame jets or apertures 16 formed in rows at each side, are connected at one end as by the manifold 17' to which the usual gas and air supply may be admitted as in usual and common practice.

As best shown in Figure 1 this burner is located as in usual practice in the upper portion of the broiler compartment 13 of the range and below the oven 10.

With a burner of this general type, such as is ordinarily used in gas ranges, the purpose is primarily to heat the oven by circulation of the heat upwards from the burner but under present practice the burner is not efficient for heating the broiler because no positive device is provided to increase the radiant efficiency of the burner and radiate the heat downward into the broiler.

In order to increase the efficiency of the broiler as well as to permit proper circulation of the heat upward to the oven when desired, radiants 17, which may be of ceramic or other suitable material, are adjustably mounted on opposite sides of the burner pipes 15 for vertical movement to positions above and below the flame jets 16.

For the purpose of supporting the radiants 17 in vertically adjusted positions a frame is provided which may comprise the metal end members 18 connected as by the central bar 19.

Each of the end members 18 of the frame may be provided near opposite ends with spaced depending legs 20 arranged to straddle the corresponding burner pipe 15 and provided with the outturned feet 21 connected as by the bolts 22 to the bars 23 which are attached to the inner edges of the radiants 17 as by bolts 24.

With the frame in lowered position, as shown in Fig. 3, the end members 18 rest upon the tops of the fuel pipes 15 and the radiants 17 are located below the flame jets 16 of the burner pipes.

For the purpose of manually adjusting the radiants relative to the burner pipes any suitable device may be provided, such as the upright post 25 connected to the central bar 19 of the frame and provided with a notch 26 adapted to be engaged by the bolt 27 for holding the frame in the raised position as indicated in Figure 1.

In this position of the device the radiants 17 extend outwardly at each side of the burner pipe just above the flame jets 16 so that the frames impinge upon the radiants heating them so that the heat is radiated downwardly directly upon the food in the broiler.

With the radiants in the lowered position, as shown in Fig. 3, it will be seen that the radiants are located below the flame jets 16 cutting off radiated heat to the broiler and permitting all of the heat from the burners to circulate upward into the oven.

With this construction it will be seen that the maximum heat of the burners may be obtained either in the oven or the broiler as desired so that either the oven or broiler may be operated at the utmost efficiency.

I claim:

1. An oven and broiler burner including a plurality of parallel fuel pipes each having flame jets along opposite sides thereof, a vertically adjustable frame including end frame members located above opposite end portions of the fuel pipes and disposed transversely thereof, a longitudinally disposed central bar connecting the end frame members, each end frame member having inverted, U-shape portions straddling the end portions of the pipes, horizontal imperforate radiants carried by the U-shape portions and disposed on opposite sides of the pipe, and means for vertically moving the frame relative to the fuel pipes to position said horizontal radiants just above the flame jets so as to heat the radiants by the flame from the flame jets whereby the radiants will radiate the heat downward, and to position the horizontal radiants below the flame jets so as to permit the heat from the flame jets to circulate upward therefrom.

2. An oven and broiler burner including a plurality of parallel fuel pipes each having flame jets along opposite sides thereof, a vertically adjustable frame including end frame members located above opposite end portions of the fuel pipes and disposed transversely thereof, a longitudinally disposed central bar connecting the end frame members, each end frame member having inverted, U-shape portions straddling the end portions of the pipes, horizontal imperforate radiants carried by the U-shape portions and disposed on opposite sides of the pipe, and means for vertically moving the frame relative to the fuel pipes to position said horizontal radiants just above the flame jets so as to heat the radiants by the flames from the flame jets whereby the radiants will radiate the heat downward, and to position the horizontal radiants below the flame jets so as to permit the heat from the flame jets to circulate upward therefrom, and means for holding the frame in each adjusted position.

RAYMOND J. GREENE.

REFERENCES CITED

The following references are of record in the file of this patent:

UNITED STATES PATENTS

| Number | Name | Date |
| --- | --- | --- |
| 1,699,032 | Shuell et al. | Jan. 15, 1929 |
| 1,887,408 | Goehring | Nov. 8, 1932 |
| 2,052,067 | Zeimet | Aug. 25, 1936 |
| 2,219,787 | Parker | Oct. 29, 1940 |

FOREIGN PATENTS

| Number | Country | Date |
| --- | --- | --- |
| 9,137 | Great Britain | 1899 |
| 161,779 | Germany | July 1, 1905 |
| 853,322 | France | Nov. 28, 1940 |